United States Patent
Chun et al.

(10) Patent No.: US 8,830,915 B2
(45) Date of Patent: Sep. 9, 2014

(54) METHODS OF PERFORMING DATA COMMUNICATION IN WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 992 days.

(21) Appl. No.: 12/451,351

(22) PCT Filed: May 9, 2008

(86) PCT No.: PCT/KR2008/002638
§ 371 (c)(1),
(2), (4) Date: Feb. 23, 2010

(87) PCT Pub. No.: WO2008/140235
PCT Pub. Date: Nov. 20, 2008

(65) Prior Publication Data
US 2010/0208667 A1 Aug. 19, 2010

Related U.S. Application Data

(60) Provisional application No. 60/917,285, filed on May 10, 2007.

(30) Foreign Application Priority Data

May 9, 2008 (KR) ........................ 10-2008-0043587

(51) Int. Cl.
*H04W 4/00* (2009.01)
*H04W 72/12* (2009.01)
*H04W 76/04* (2009.01)
*H04W 72/04* (2009.01)

(52) U.S. Cl.
CPC .......... *H04W 72/1289* (2013.01); *H04W 76/04* (2013.01); *H04W 72/04* (2013.01)
USPC ........................................................ 370/329

(58) Field of Classification Search
CPC .. H04W 72/04; H04W 72/1289; H04W 76/04
See application file for complete search history.

(56) References Cited

U.S. PATENT DOCUMENTS 6,898,195 B1 * 5/2005 Molno et al. .................. 370/329
2006/0039319 A1 * 2/2006 Lee et al. ...................... 370/328

(Continued)

FOREIGN PATENT DOCUMENTS

KR 10-2002-0081840 10/2002

OTHER PUBLICATIONS

Catt: "Optimization of uplink resource assignment strategies" 3GPP TSG-RAN WG2#56bis; R2-070113, Jan. 2007, XP050133226.

(Continued)

*Primary Examiner* — Steven H Nguyen
(74) *Attorney, Agent, or Firm* — Mckenna Long & Aldridge LLP

(57) ABSTRACT

A method of performing data communication with a base station by a mobile terminal in a wireless communication system includes transmitting uplink data to the base station or receiving downlink data from the base station by using first channel resource assignment information among two or more channel resource assignment information, receiving from the base station a channel resource modification indicator indicating that a channel resource for transmitting or receiving data should be modified, and transmitting the uplink data to the base station or receiving the downlink data from the base station by using second channel resource assignment information among the two or more channel resource assignment information. Therefore, the efficiency of a channel resource can be improved in a wireless communication system.

12 Claims, 3 Drawing Sheets

(56) References Cited

U.S. PATENT DOCUMENTS

| | | |
|---|---|---|
| 2007/0058544 A1 | 3/2007 | Kim et al. |
| 2008/0045272 A1* | 2/2008 | Wang et al. .................. 455/561 |
| 2008/0090583 A1* | 4/2008 | Wang et al. ................ 455/452.1 |
| 2008/0117891 A1* | 5/2008 | Damnjanovic et al. ....... 370/345 |
| 2008/0267118 A1* | 10/2008 | Cai et al. ...................... 370/329 |
| 2009/0274107 A1* | 11/2009 | Park et al. .................... 370/329 |

OTHER PUBLICATIONS

Ericsson: "Semi persistent scheduling" 3GPP TSG-RAN WG2 Meeting #55; R2-062859, Oct. 2006, XP050132382.

* cited by examiner

METHODS OF PERFORMING DATA COMMUNICATION IN WIRELESS COMMUNICATION SYSTEM

This application claims priority to International Application No. PCT/KR2008/002638 filed on May 9, 2008, which claims priority to Provisional Application No. 60/917,285 filed on May 10, 2007 and Korean Patent Application No. 10-2008-0043587 filed on May 9, 2008, all of which are incorporated by reference for all purposes as if fully set forth herein.

TECHNICAL FIELD

The present invention relates to a communication system, and more particularly, to a data transmitting and receiving method in a wireless communication system.

BACKGROUND ART

FIG. 1 illustrates a structure of a wireless access protocol for transmitting data in a wireless interval of a universal mobile telecommunication system (UMTS) which is a 3rd generation mobile communication system. A data link layer corresponding to a second layer L2 of an open system interconnection (OSI) reference model includes a medium access control (MAC) layer, a radio link control (RLC) layer, a packet data convergence protocol (PDCP) layer, and a broadcast/multicast control (BMC) layer. A physical layer corresponds to a first layer L1. Information exchange between protocol layers is made through a virtual access point of a service access point (SAP). Parts indicated by ellipses in FIG. 1 correspond to SAPs. A unit of data transferred between the respective layers is denominated by different names according to layers and this is called a service data unit (SDU). A basic unit used to transmit data by a protocol is called a protocol data unit (PDU). Hereinafter, data transferred between the layers in the structure of the radio access protocol represents a data block of a prescribed unit such as the above-described SDU or PDU.

The MAC layer which is in charge of mapping between a logical channel and a transport channel selects an appropriate transport channel to transmit data transferred by the RLC layer and adds necessary control information to a header of a MAC PDU. The MAC layer performs a radio resource management function and a measurement function. The radio resource management function controls data transmission by setting an operation of the MAC layer based on a variety of MAC parameters transmitted by a radio resource control (RRC) layer, rather than being performed by the MAC layer itself. For example, the radio resource management function is to change a mapping relationship between the logical channel and the transport channel, or to multiplex data by a scheduling function and transmit the multiplexed data. The measurement function is to measure the traffic amount of a terminal and report the measured amount to an upper layer. The upper layer can change configuration of the MAC layer based on the measured information of the terminal by the MAC layer and can efficiently manage radio resources.

The RLC layer is located at an upper side of the MAC layer and supports reliable data transmission. The RLC layer segments and concatenates RLC SDUs transmitted by the upper layer to construct data of a proper size suitable for a radio section. The RLC layer of a receiving side supports a re-combination function of data to restore original RLC SDUs from the RLC PDUs. Each RLC entity may operate as a transparent mode (TM), an unacknowledged mode (UM), or an acknowledged mode (AM) according to processing and transmitting types of the RLC SDU. If the RLC entity operates as the TM, no header information is added to the RLC SDU transferred from the upper layer and the RLC SDU is transferred to the MAC layer. If the RLC entity operates as the UM, the RLC SDUs are segmented and concatenated to construct the RLC PDUs, and header information including a sequence number is added to each RLC PDU. However, the UM does not support data re-transmission. If the RLC entity operates as the AM, the RLC PDUs are segmented and concatenated to construct the RLC PDUs and can re-transmit data when packet transmission fails. For a re-transmission function of the AM, various parameters and variables are used such as a transmission window, a reception window, a timer, a counter, etc.

The PDCP layer is used only in a packet exchange region and may transmit data by compressing a header of an IP packet so as to increase the transmission efficiency of packet data in a radio channel. The PDCP manages a sequence number to prevent data from being lost during relocation of a serving radio network controller (SRNC).

The BMC layer broadcasts a cell broadcasting message transferred by a core network to users through a common channel.

The physical layer of the first layer provides an information transfer service to the upper layer by using a physical channel. The physical layer is connected to the MAC layer through the transport channel and data between the MAC layer and the physical layer is transferred through the transport channel. Data between different physical layers, that is, between a physical layer of a transmitting side and a physical layer of a receiving side is transferred through the physical channel.

The RRC layer located at the lowermost side of a third layer is defined only in a control plane and controls the logical channel, the transport channel, and the physical channel in association with configuration, re-configuration, and release of radio bearers (RBs). The RB means a service provided by the second layer to transfer data between networks including a terminal and a base station. The control plane indicates a layer structure transferring control information in a vertical structure of the wireless access protocol of FIG. 1. A user plane represents a layer structure transmitting user information such as data information. Next, a voice call service using the wireless access protocol of FIG. 1 will be described.

Voice data generated through, for example, an adaptive multi-rate (AMR) codec has a specific characteristic. The voice data is divided into a talk spurt and a silent period. The talk spurt means a voice data period generated while a user is actually talking and the silent period is a voice data period generated while a user is not talking. A voice data block which is a voice packet including voice data in the talk spurt is generated at a specific period (for example, every 20 ms). A silent data block which is a silent packet including voice data in the silent period is also generated at the same or different period as the specific period of the voice data block (for example, every 160 ms). To use such a voice service, radio resources for an uplink and a downlink should be allocated. The base station recognizes a necessary downlink resource by itself and transmits data to the downlink by using the downlink resource. However, the radio resources for the uplink and downlink should be assigned to the terminal by the base station to transmit and receive data. Such radio resource assignment information (for example, location of a corresponding frequency, a time unit, etc.) is called scheduling information and a technique of allocating the radio resources is called a scheduling method.

If a persistent scheduling method which is a kind of the scheduling method is used for a voice call, the base station sets the radio resources suitable for the talk spurt. That is, by using a characteristic that the voice data block is generated at a first period, for example, 20 ms, the base station previously sets the radio resources for transmitting and receiving uplink or downlink data to the terminal at intervals of 20 ms in a call setup process. The terminal receives the downlink data or transmits the uplink data by using the previously set radio resources at intervals of 20 ms. If the state of the terminal is changed from the talk spurt to the silent period, since the silent data block is generated at a second period (for example, every 160 ms), a considerable amount of radio resources allocated at intervals of 20 ms are wasted.

Similarly, if the state of the terminal is changed from the silent period to the talk spurt in the case where the base station previously allocates the radio resource to the terminal suitably for the silent period at intervals of 160 ms according to the persistent scheduling method, the terminal has lots of voice information to be transmitted but has a little amount of resources allocated. Therefore, transmission of voice information is delayed.

DISCLOSURE

Technical Problem

Therefore, an efficient radio resource allocating method is needed for a real-time streaming service of a data block having a constant size and periodicity such as a voice over Internet protocol (VoIP).

An object of the present invention devised to solve the problem lies on providing a data communication performing method in a mobile communication system.

Another object of the present invention devised to solve the problem lies on providing a channel resource allocating method in a mobile communication system using one or more resource allocation information.

Technical Solution

One aspect of the present invention provides a method of performing data communication with a base station by a mobile terminal in a wireless communication system. The method includes: transmitting uplink data to the base station or receiving downlink data from the base station by using first channel resource assignment information among two or more channel resource assignment information; receiving from the base station a channel resource modification indicator indicating that a channel resource for transmitting or receiving data should be modified; and transmitting the uplink data to the base station or receiving the downlink data from the base station by using second channel resource assignment information among the two or more channel resource assignment information.

In another aspect of the present invention provided herein is a method of performing data communication with a terminal by a base station in a wireless communication system. The method includes: transmitting downlink data to the terminal or receiving uplink data from the terminal by using first channel resource assignment information among two or more channel resource assignment information; determining whether to modify a channel resource for transmitting and receiving data; and transmitting to the terminal a channel resource modification indicator indicating that the channel resource for transmitting or receiving the data should be modified when the channel resource is needed to be modified.

Advantageous Effects

The data communication performing method using a channel resource modification indicator in a wireless communication system according to the present invention has the following effects.

First, the efficiency of a mobile communication system can be improved by rapidly transmitting radio resource allocation information for a terminal in various ways.

Second, an optimal channel resource can be allocated to a terminal suitably for a circumstance of a radio communication system.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
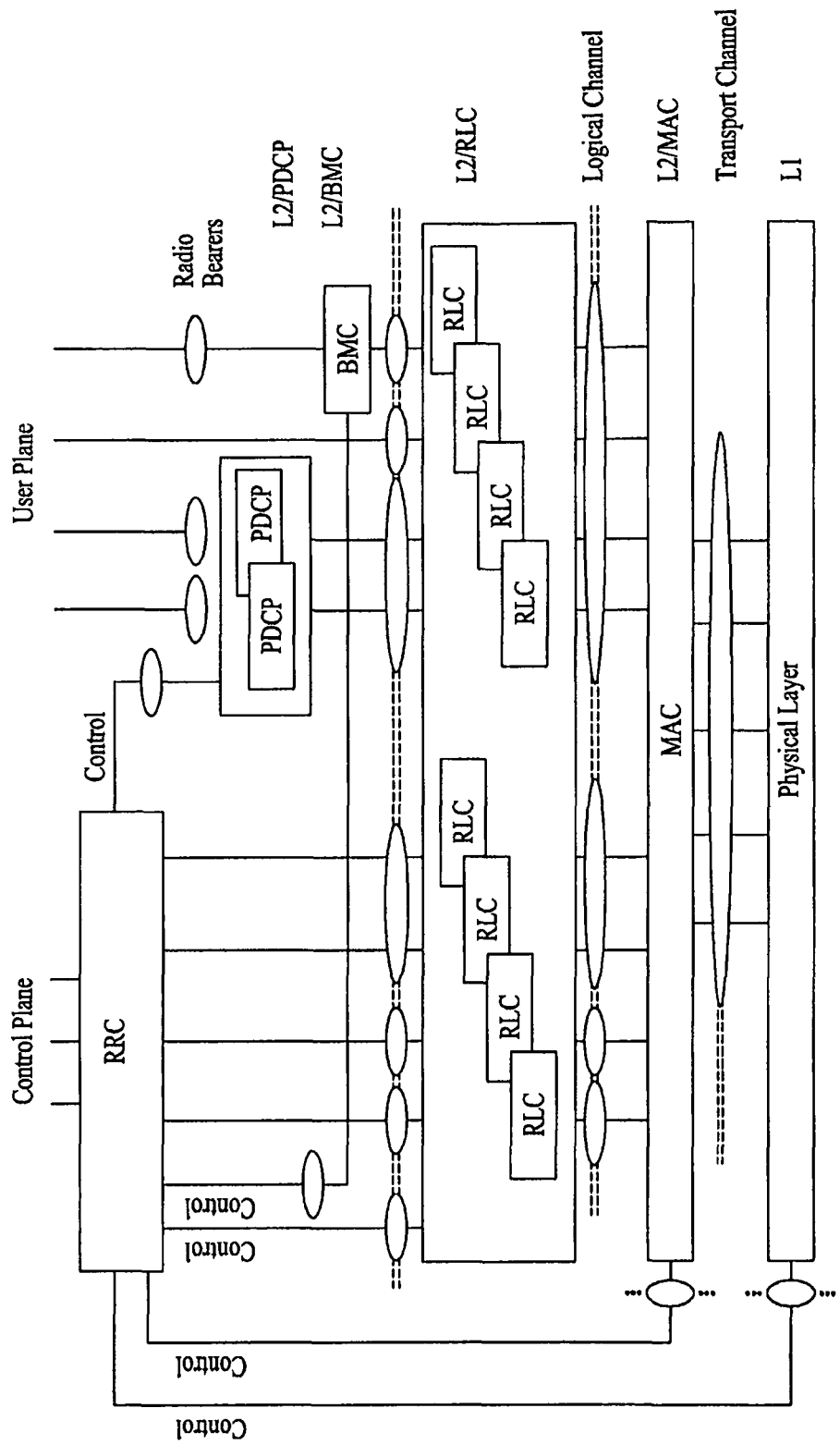
FIG. 1 illustrates a structure of a wireless access protocol for transmitting data in a wireless interval of a universal mobile telecommunication system (UMTS) which is a 3rd generation mobile communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The exemplary embodiments which will be described hereinbelow are applied to evolved universal mobile telecommunications system (E-UMTS) of which technical characteristic is called long term evolution (LTE), however, it is apparent that they are also applied to other mobile communication systems such as IEEE 802.16m and a Wibro system.

The E-UMTS system is a system evolved from an existing WCDMA UMTS system and its basic standardization work is in progress in the 3rd Generation Partnership Project (3GPP). Detailed contents of technical specification of UMTS and E-UMTS may refer to Release 7, Release 8, and Release 9 of "3rd Generation Partnership Project; Technical Specification Group Radio Access Network".

The following technologies may be applied to various communication systems including multiple antenna techniques.

A communication system is widely used to provide a variety of communication services such as voice and packet data services. This technique may be used in a downlink or an uplink. The downlink designates communication from a base station to a terminal, and the uplink designates communication from the terminal to the base station. The base station includes a network except for the terminal, in a communication system including an upper layer as well as a physical transport stage as a fixed point communicating with the terminal. Therefore, in the present invention, the network and the base station have the same meaning as parts opposite to the terminal. The terminal is fixed or has mobility. The present invention may be applied to a single-carrier or multi-carrier communication system. The multi-carrier system may use orthogonal frequency division multiplexing (OFDM) or other multi-carrier modulation techniques.

To provide a voice service and a data service in the above-described mobile communication system, the terminal and the base station should share scheduling information for transmitting and receiving uplink and downlink data. The scheduling information may include a terminal identification (ID), a terminal group ID, resource assignment location and assignment duration information allocated to transmit the uplink and downlink data, transmission parameters such as a modulating technique, a payload size and multi-input multi-output (MIMO) related information, HARQ process information, a redundancy version, and new data indicator. The terminal receives downlink scheduling information from the base station to receive the downlink data, and receives uplink scheduling information to transmit the uplink data.

In the above process, a terminal ID (or group ID), such as a radio network temporary identifier (RNTI), is transmitted to inform that the downlink scheduling information transmitted through a physical downlink control channel (PDCCH) is for which terminal. The RNTI is divided into a dedicated RNTI and a common RNTI. The dedicated RNTI is used for data transmission and reception to and from the terminal about which information is registered in the base station. The common RNTI is used when communicating with terminals about which information is not registered in the base station and thus of which dedicated RNTI is not allocated, or when transmitting and receiving information, such as system information, commonly used by a plurality of terminals. For example, RA-RNTI and T-C-RNTI used for a random access process through a random access channel (RACH) are common RNTIs. The terminal ID or the group ID may be transmitted by a form masked by an error detection code such as a cyclic redundancy code (CRC) to the downlink scheduling information transmitted through the PDCCH.

Terminals located in a specific cell monitor the PDCCH through control channels of a first layer L1 and a second layer L2 by using their RNTI information, and receive the downlink scheduling information through a corresponding PDCCH when CRC decoding is successful by their RNTIs. The terminal receives downlink data transmitted thereto through a physical downlink shared channel (PDSCH) indicated by the received downlink scheduling information. Hereinafter, a scheduling method between the terminal and the base station is described.

The scheduling method is divided into dynamic scheduling, persistent scheduling, and semi-persistent scheduling methods. The dynamic scheduling method is to transmit scheduling information to the terminal through a dedicated physical control channel (DPCCH) whenever it is necessary to assign an uplink or downlink resource to a specific terminal. The persistent scheduling is to statically assign downlink or uplink scheduling information to the terminal by the base station at the beginning of a call setup such as an RB configuration. Although the persistent scheduling method has the advantage of assigning a necessary amount of resources, speed and capacity are deteriorated due to signaling load between the terminal and the base station.

The persistent scheduling method uses scheduling information previously assigned to the base station, without assigning the downlink or uplink scheduling information by the base station whenever transmitting or receiving data. For example, if the base station has previously set a terminal to receive downlink data by a radio resource (for example, a frequency location) of 'A' in a transport format (for example, transport block size, modulation and coding information) of 'B' at a period of 'C' by an RRC message in an RB configuration process, the terminal can receive the downlink data transmitted by the base station by using information of 'A', 'B', and 'C'. Similarly, when the terminal transmits data to the base station, the terminal can transmit uplink data using a previously determined radio resource according to previously assigned uplink scheduling information. The persistent scheduling method is optimized for a service of which traffic characteristic is regular.

The semi-persistent scheduling method is to permanently assign a radio resource by previously determining the size and period of a packet when the terminal communicates with the network. Then the terminal transmits data to the base station through the previously assigned radio resource. Therefore, there is no need for the terminal to request the base station that the radio resource should be transmitted and there is no need for the base station to assign the radio resource through a control signal according to a request for the radio resource by the terminal. That is, since the channel resource is allocated by previously predicting generation of the packet when there is no change in the generation of the packet, the channel resource is effectively allocated for packet transmission having a constant size and periodicity.

One embodiment of the present invention provides a data communication performing method for transmitting and receiving uplink and downlink data by a terminal using one or more resource setting information in the semi-persistent scheduling method. The base station transmits control information including two or more channel resource assignment information to the terminal in assigning uplink and downlink resources to the terminal by the semi-persistent scheduling method. The two or more channel resource assignment information for uplink and downlink may be known to the terminal through an RB configuration process during a call setup by the base station. In this case, the base station may inform the terminal of the channel resource assignment information for the uplink and downlink to be used during an initial call setup. Alternatively, the base station may inform the terminal of two or more changed channel resource assignment information during the middle of a call by using a dedicated channel. This procedure corresponds to the case where if a call re-setting is needed by handover and thus channel resource assignment information is received from a base station of a new cell, the base station of the new cell informs a corresponding terminal which enters the new cell of two or more new channel resource assignment information.

In some cases, it is necessary to change the channel resource assignment information of the uplink currently used by the terminal in the middle of a call. For example, a voice call service may be changed from a talk spurt to a silent period. Then the terminal may transmit control information indicating that it is necessary to change the channel resource assignment information to the base station. Alternatively, the base station may recognize that channel resource assignment of uplink data transmission should be changed by measuring a variation in the transmission amount of uplink data and transmit a channel resource modification indicator (CRMI) for informing the terminal of a change of the channel resource to the terminal.

The terminal may change the channel resource assignment for the uplink data transmission by using channel resource setting information indicated by the CRMI transmitted by the base station among the two or more channel resource setting information, or may change the channel resource assignment by recognizing that the channel resource assignment for the uplink data transmission should be changed and appropriately selecting one of the two or more channel resource setting information previously received through an RB configuration process. Alternatively, the terminal may change the channel resource assignment for receiving downlink data from the base station by receiving the CRMI indicating a change of the channel resource for receiving the downlink data transmitted by the base station.

The CRMI indicates a change of the channel resource assignment so as to be used by at least one of a specific uplink and a specific downlink among two or more channel resource assignment information shared by the base station and the terminal. To this end, a sequence number may be allocated to the CRMI in the order of arrangement of the two or more channel resource assignment information so that the CRMI to which sequence number is allocated can be transmitted to the terminal. The CRMI may be transmitted to the terminal by the base station by using a control channel in a physical layer. Alternatively, the CRMI may be transmitted to the terminal by the base station through control information within a MAC PDU such as a MAC control element.

Another embodiment of the present invention provides a method of transmitting and receiving downlink and uplink data by a base station using one or more channel resource setting information in a semi-persistent scheduling method. Since the base station can assign the channel resource assignment for communication with the terminal, the base station can assign necessary channel resource of the uplink and downlink and can share two or more channel resource assignment information used to transmit the uplink or downlink data to the terminal by the base station through an RB configuration process.

The base station transmits the two or more channel resource assignment information to the terminal. The one or more channel resource assignment information can be transmitted to the terminal through the RB configuration process in a call setup process. In this case, the channel resource assignment information for the first downlink transmission and the first uplink transmission may be transmitted together or may be transmitted after a given time period. The base station may transmit the downlink data to the terminal or receives the uplink data from the terminal.

While the downlink and uplink communication is performed between the base station and the terminal by using the initial channel resource assignment information, a change of the channel resource necessary for at least one of the uplink and downlink data transmissions may be needed. Therefore, the base station determines whether it is necessary to change the channel resource for the uplink or downlink data transmission. The necessity of changing the channel resource necessary for the downlink transmission may be recognized by analyzing a variation in the size of the downlink data received from a core network by the base station. Alternatively, the base station may recognize the necessity of changing the channel resource necessary for the uplink transmission by receiving control information indicating that the channel resource for the uplink transmission should be changed or by recognizing a variation in the transmission amount of the uplink data from the terminal.

To change the channel resource assignment, the base station transmits a CRMI indicating channel resource assignment necessary for the uplink or downlink transmission among the two or more channel resource assignment information to the terminal, and the base station transmits downlink data or receives uplink data by using the channel resource assignment information indicated by the CRMI. That is, the base station transmits the downlink data by a channel resource corresponding to the channel resource assignment information indicated by the CRMI to the terminal and the terminal receives the downlink data. The base station may receive the uplink data from the terminal by the channel resource corresponding to the uplink channel resource assignment information indicated by the CRMI.

Still another embodiment of the present invention provides a data communication performing method using one or more channel resource setting information in a VoIP.

The VoIP is a service for transmitting voice data through an IP in a packet switched (PS) region instead of a conventional circuit switched (CS) region. The CS-based voice service transmits data while maintaining an end-to-end connection, whereas the VoIP transmits data in a connection-less mode. Accordingly, the VoIP can efficiently use a network resource. With the development of communication, user data has been rapidly increased and the conventional CS-based service has been replaced by the PS-based service. The VoIP was developed in this point of view.

Although the VoIP can effectively use the network resource, its quality of service (QoS) is lower than the CS-based voice service. Factors affecting the QoS include a delay, a jitter, and a frame error rate (FER). In the early development of the VoIP, the QoS is very low compared with the CS-based voice service, but the VoIP of a wired duration guarantees nearly equal QoS to the CS-based voice service as many studies have been made. For example, a real-time transport protocol (RTP) effectively providing the PS-based voice service and an RTP control protocol (RTCP) serving as feedback for transmission of an RTP packet have been developed. Since the RTP carries a time stamp per every packet, a jitter problem can be solved. Since the RTCP reports loss of the RTP packet and enables an RTP source to control a rate, an FER is reduced. In addition to RTP and the RTCP, a session initiation protocol (SIP) and a session description protocol (SDP) etc. are developed to maintain an end-to-end virtual connection, thereby solving a delay problem.

Unlike the VoIP of a wired duration, the VoIP of a wireless duration does not sufficiently satisfy the QoS. Therefore, robust header compression (ROHC) of an improved compression technique has been developed and used to raise the transmission efficiency of the VoIP. However, the RTP of real-time user data is insensitive to an error and sensitive to a delay and a jitter, whereas the RTCP of control data is insensitive to a delay and a jitter and sensitive to an error. The RTP carrying voice data transmits packets of a small size regularly and frequently, whereas the RTCP transmits packets of a relatively big size irregularly and infrequently. As an example of solving the above-described problems in the radio VoIP service, the exemplary embodiment of the present invention describes a data communication performing method using one or more channel resource assignment information.

Figure 2:
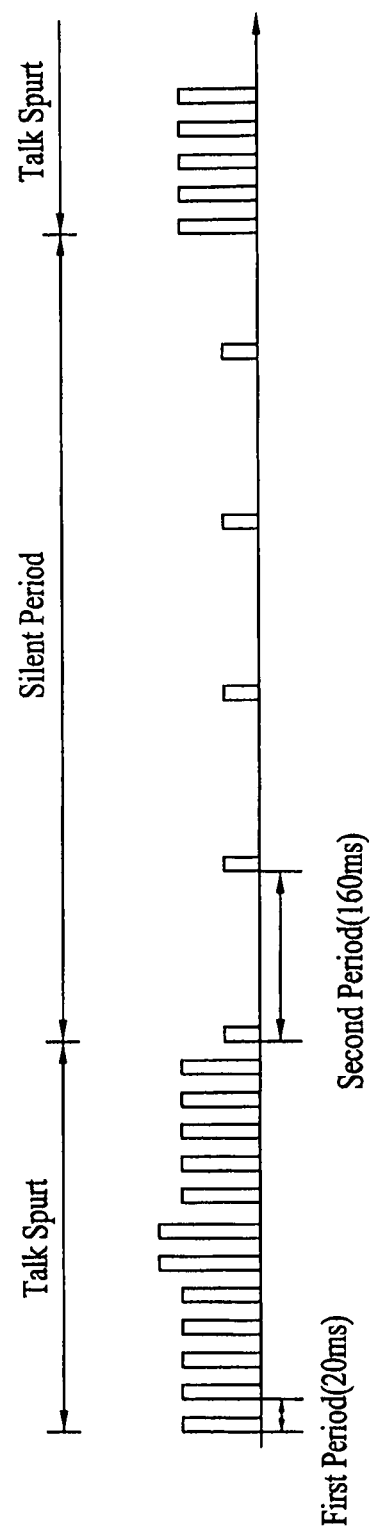
FIG. 2 illustrates an example of a traffic model in a voice call service to which an adaptive multi-rate (AMR) in mobile communication system is applied.

FIG. 2 illustrates an example of a traffic model in a voice call service to which an adaptive multi-rate (AMR) mobile communication system is applied. Referring to FIG. 2, when applying an AMR of 12.2 kbps, a voice data block of a size of 35 to 49 bytes is generated at a first period of 20 ms in a talk spurt and a silent data block of a size of 10 to 24 bytes is generated at a period of 160 ms in a silent period. It is difficult to predict the start and end of the talk spurt since a voice call has an irregular characteristic.

Figure 3:
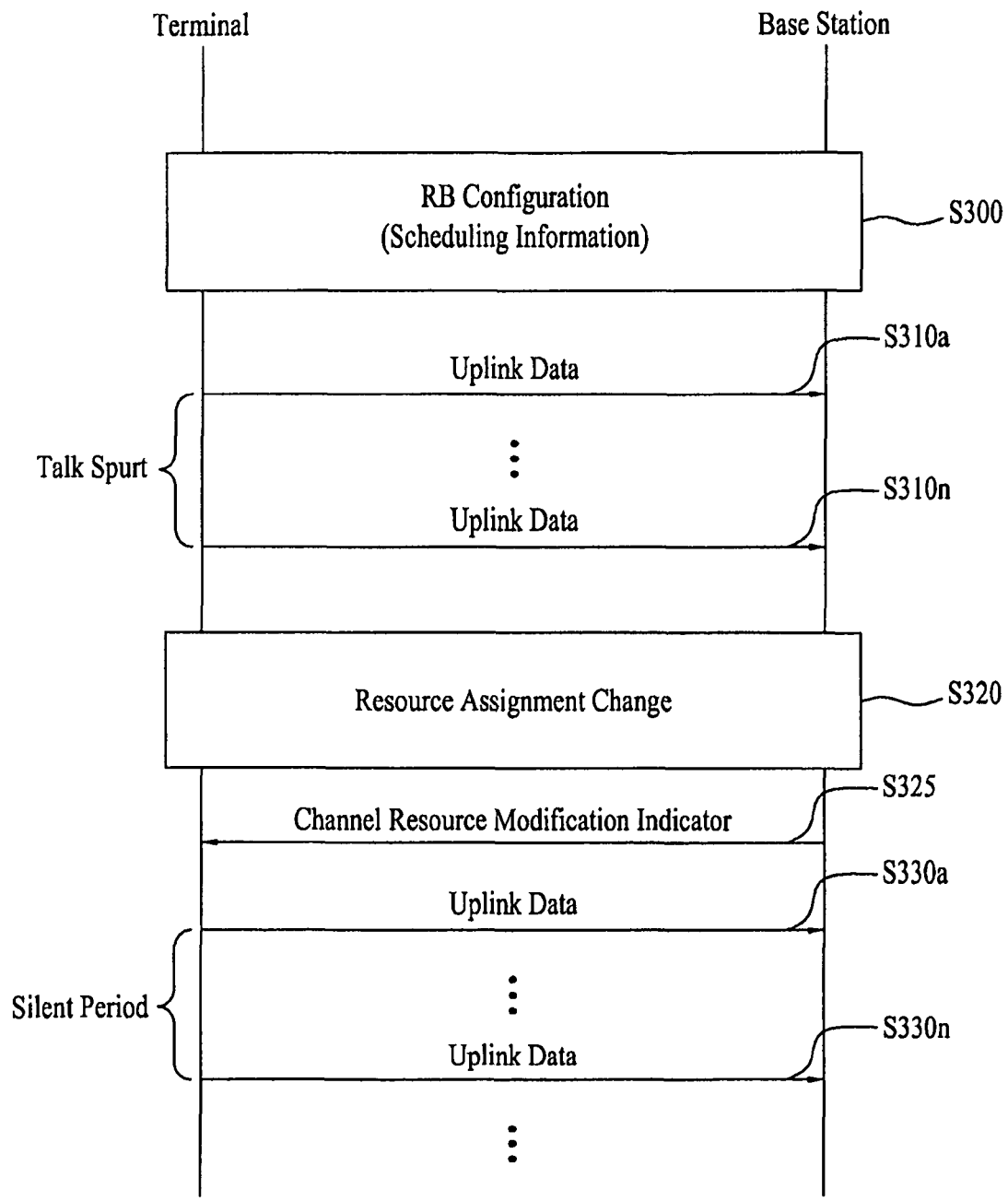
FIG. 3 is a flow chart illustrating a data transmitting procedure using a channel resource modification indicator (CRMI) according to an exemplary embodiment of the present invention.

FIG. 3 is a flow chart illustrating a data communication performing procedure using a CRMI according to the present invention. The embodiment of FIG. 3 is an example to which the present invention is applied in a data communication performing method between a terminal and a base station during a voice call using a semi-persistent scheduling method and applying an AMR technique.

Referring to FIG. 3, the terminal configures an RB with a base station after entering a network (step S300). The base station transmits uplink scheduling information and downlink scheduling information to the terminal to adapt semi-persistent scheduling method in the RB configuration process.

Each of the uplink scheduling information and downlink scheduling information may include one or more channel resource assignment information. Each of the uplink scheduling information and downlink scheduling information transmitted during the RB configuration process may include channel resource assignment information used for the first uplink transmission and reception and the first downlink transmission and reception.

The terminal transmits data generated during a voice call to the base station by using the channel resource assignment information included in the uplink scheduling information and receives downlink data transmitted by the base station by using the channel resource assignment information contained in the downlink scheduling information. The uplink scheduling information and the downlink scheduling information may further include information on data transmission and reception periods in a talk spurt and in a silent period. If the AMR technique is applied, lengths of the talk spurt and the silent period in a voice call service may vary according to an AMR mode and the necessary amount of resource assignment may vary. In the exemplary embodiment of the present invention, one or more transmission period may be allocated in the talk spurt and the silent period.

Table 1 shows a channel resource assignment method according to a voice service interval in each AMR mode when each of the talk spurt and the silent period has one transmission period in a voice call having N AMR modes. The talk spurt and the silent period in each AMR mode have mapping information on the channel resource assignment. The CRMI indicates which channel resource is to be used in the channel resource assignment shown in Table 1. For example, if the uplink of a current terminal is changed from the talk spurt of AMR mode 2 to the silent period of AMR mode 2, the base station recognizing this transmits sets a CRMI to 1 and transmits the CRMI to the terminal. Then the terminal uses an uplink channel resource corresponding thereto.

TABLE 1

|  | Talk Spurt | Silent Period |
|---|---|---|
| AMR mode 1 | CRMI = 0 | CRMI = 1 |
| AMR mode 2 | CRMI = 0 | CRMI = 1 |
| ... | ... | ... |
| AMR mode N | CRMI = 0 | CRMI = 1 |

Even though a call is connected after the RB configuration process, the terminal and the base station can share control information including one or more channel resource assignment information corresponding to Table 1 and share information on which channel resource is to be assigned. This means that the terminal enters another cell due to handover to receive one or more channel resource assignment information in a new base station from the base station of another cell and that the new base station and the terminal share the one or more new channel resource assignment information. Alternatively, the terminal may fixedly use the one or more channel resource assignment information by previously storing one or more usable channel resource assignment information in the interior of the terminal through a hardware download process.

Table 2 shows channel resource assignment for the CRMI indicating a change of a channel resource assignment type according to the voice spurt in each AMR mode when the talk spurt has two or more transmission periods in a voice call having N AMR modes. The assignment shown in Table 2 may be applied to the silent period.

TABLE 2

| Talk Spurt | First Period | Second Period | ... | Nth Period |
|---|---|---|---|---|
| AMR 1 | CRMI = 0 | CRMI = 1 | ... | CRMI = N |
| AMR 2 | CRMI = 0 | CRMI = 1 | ... | CRMI = N |
| ... | ... | ... | ... | ... |
| AMR N | CRMI = 0 | CRMI = 1 | ... | CRMI = N |

As is in Table 1, the terminal and the base station can share information shown in Table 2 and channel resource assignment information.

As described above, if the terminal enters the talk spurt, the terminal periodically transmits uplink data for voice data generated during the voice spurt according to a data transmission period in the talk spurt by using the first channel resource assignment information within the uplink scheduling information received from the base station (steps S310a to S310n).

Next, if it is necessary to change the talk spurt to the silent period, the terminal changes the talk spurt to the silent period (step S320). In this case, the terminal may transmit control information indicating a change to the silent period to the uplink. Alternatively, the base station may recognize a change to the silent period by analyzing uplink data (for example, a remarkable variation in a size of a voice data block) from the terminal.

If the base station recognizes the necessity of a change to the silent period, the base station transmits to the terminal a CRMI indicating channel resource assignment information of the silent period of an AMR mode of the terminal (step S325). If the terminal recognizes that it enters the silent period, the terminal may transmit uplink data by assigning thereto a channel resource suitable for the silent period of a current AMR mode from the two or more channel resource assignment information received through the RB configuration process (step S300) and simultaneously may transmit the CRMI corresponding to a channel resource of the uplink data to the base station.

Thereafter, if the terminal enters the silent period, the terminal periodically transmits silent data to the base station according to a data transmission period in the silent period by using the uplink channel resource assignment information received from the base station (steps S330a to S330n). If a change to the talk spurt from the silent period is needed (step S320), the silent period is changed to the talk spurt through the step S320 and the steps S330a to S330n.

In the exemplary embodiment shown in FIG. 3, parameters at an RB configuration for a semi-permanent radio assignment setting according to the semi-persistent scheduling method may be transmitted to the terminal through an RRC message.

The CRMI received from the base station may be directly transmitted to the terminal through a physical control channel such as a PDCCH or may be transmitted to the terminal through a MAC message such as a MAC control element in a MAC layer.

While the detailed description has been disclosed in terms of a communication performing process between a transmitting side and a receiving side to easily understand the present invention and its embodiment, it will be appreciated that the transmitting side may be a terminal or a base station of a network and the receiving side may be the base station of the network or the terminal. The terminology employed herein may be replaced by other terms having the same meaning. For example, the terminal may be replaced by a mobile station, a mobile terminal, a user equipment, a user device, etc. The base station may be replaced by a fixed station, a node B (NB), eNB, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system such as a mobile communication system, a wireless Internet system.

The invention claimed is:

1. A method of performing data communication with a base station by a mobile terminal in a wireless communication system, comprising:
   receiving two or more channel resource assignment information from the base station;
   allocating channel resource based on first channel resource assignment information among the two or more channel resource assignment information;
   transmitting uplink data to the base station by using the allocated channel resource;
   receiving, from the base station, a channel resource modification indicator indicating that a channel resource for transmitting data should be modified, wherein the base station determines whether to modify the channel resource for transmitting the uplink data at the mobile terminal, based on a specific AMR (Adaptive Multi-Rate) mode for the mobile terminal among a plurality of AMR modes;
   changing the channel resource based on second channel resource assignment information among the two or more channel resource assignment information; and
   transmitting the uplink data to the base station by using the changed channel resource,
   wherein a talk spurt corresponding to each of the plurality of AMR modes has two or more transmission periods,
   wherein the channel resource modification indicator further indicates the transmission period of the talk spurt corresponding to the specific AMR mode.

2. The method according to claim 1, wherein the channel resource modification indicator indicates that the channel resource for the first channel resource assignment information should be modified to the channel resource for the second channel resource assignment information.

3. The method according to claim 2, wherein the two or more channel resource assignment information are received from the base station in at least one case of a call setup process and a call re-setup process.

4. The method according to claim 1, wherein the first channel resource assignment information is on the channel resource for transmitting the uplink data in the talk spurt during a voice call.

5. The method according to claim 4, wherein the second channel resource assignment information is on the channel resource for transmitting the uplink data in a silent period during the voice call.

6. A method of performing data communication with a terminal by a base station in a wireless communication system, comprising:
   transmitting two or more channel resource assignment information to the terminal;
   receiving uplink data from the terminal by using first channel resource assignment information among the two or more channel resource assignment information, wherein the terminal allocates channel resource based on the first channel resource assignment information;
   determining whether to modify a channel resource for transmitting the uplink data at the terminal based on a specific AMR (Adaptive Multi-Rate) mode for the terminal among a plurality of AMR modes;
   transmitting to the terminal a channel resource modification indicator indicating that the channel resource for transmitting the uplink data should be modified when the channel resource is needed to be modified; and
   receiving the uplink data from the terminal by using second channel resource assignment information among the two or more channel resource assignment information, wherein the terminal changes the channel resource based on the second channel resource assignment,
   wherein a talk spurt corresponding to each of the plurality of AMR modes has two or more transmission periods,
   wherein the channel resource modification indicator further indicates the transmission period of the talk spurt corresponding to the specific AMR mode.

7. The method according to claim 6, wherein the channel resource modification indicator indicates that the channel resource for the first channel resource assignment information should be modified to the channel resource for the second channel resource assignment information.

8. The method according to claim 7, wherein the two or more channel resource assignment information are transmitted to the terminal in at least one case of a call setup process and a call re-setup process.

9. The method according to claim 6, wherein the first channel resource assignment information is on the channel resource for receiving the uplink data in the talk spurt during a voice call.

10. The method according to claim 9, wherein the second channel resource assignment information is on the channel resource for receiving the uplink data in a silent period during the voice call.

11. The method according to claim 1, wherein the first channel resource assignment information is on the channel resource for transmitting the uplink data in a first talk spurt during a voice call, and
   wherein the second channel resource assignment information is on the channel resource for transmitting the uplink data in a second talk spurt during the voice call.

12. The method according to claim 6, wherein the first channel resource assignment information is on the channel resource for transmitting the uplink data in a first talk spurt during a voice call, and
   wherein the second channel resource assignment information is on the channel resource for transmitting the uplink data in a second talk spurt during the voice call.

* * * * *